United States Patent
Akahori (10) Patent No.: US 11,134,238 B2
(45) Date of Patent: Sep. 28, 2021

(54) GOGGLE TYPE DISPLAY DEVICE, EYE GAZE DETECTION METHOD, AND EYE GAZE DETECTION SYSTEM

(71) Applicant: LAPIS Semiconductor Co., Ltd., Yokohama (JP)

(72) Inventor: Hiroji Akahori, Yokohama (JP)

(73) Assignee: LAPIS SEMICONDUCTOR CO., LTD., Yokohama (JP)

( * ) Notice: Subject to any disclaimer, the term of this patent is extended or adjusted under 35 U.S.C. 154(b) by 0 days.

(21) Appl. No.: 16/123,111

(22) Filed: Sep. 6, 2018

(65) Prior Publication Data
US 2019/0082170 A1    Mar. 14, 2019

(30) Foreign Application Priority Data

Sep. 8, 2017  (JP) .............................. JP2017-173344

(51) Int. Cl.
| | |
|---|---|
| G06F 3/01 | (2006.01) |
| H04N 13/383 | (2018.01) |
| G06K 9/00 | (2006.01) |
| H04N 5/225 | (2006.01) |

(52) U.S. Cl.
CPC ........... *H04N 13/383* (2018.05); *G06F 3/013* (2013.01); *G06K 9/0061* (2013.01); *G06K 9/00248* (2013.01); *G06K 9/00604* (2013.01); *H04N 5/2253* (2013.01); *H04N 5/2257* (2013.01)

(58) Field of Classification Search
None
See application file for complete search history.

(56) References Cited

U.S. PATENT DOCUMENTS

| | | | | |
|---|---|---|---|---|
| 5,471,542 A | * | 11/1995 | Ragland | A61B 3/113 351/208 |
| 7,344,251 B2 | * | 3/2008 | Marshall | A61B 3/112 351/246 |
| 7,370,970 B2 | * | 5/2008 | Hammoud | G06K 9/00604 351/222 |
| 8,235,529 B1 | * | 8/2012 | Raffle | G06K 9/00604 351/209 |
| 8,371,693 B2 | * | 2/2013 | Ebisawa | G16H 50/30 351/206 |
| 8,510,166 B2 | * | 8/2013 | Neven | G06F 3/013 705/14.68 |
| 8,542,879 B1 | * | 9/2013 | Nechyba | G06K 9/00228 382/103 |
| 8,696,113 B2 | * | 4/2014 | Lewis | G06F 3/011 345/8 |
| 8,733,927 B1 | * | 5/2014 | Lewis | G06F 3/011 345/8 |

(Continued)

FOREIGN PATENT DOCUMENTS

| | | |
|---|---|---|
| JP | 2008102902 A | 5/2008 |
| JP | 2014021707 A | 2/2014 |

(Continued)

*Primary Examiner* — Michael J Jansen, II
(74) *Attorney, Agent, or Firm* — Rabin & Berdo, P.C.

(57) ABSTRACT

A goggle type display device with a goggle-shaped frame and a display mounted on said frame includes: an image-capturing unit disposed inside of the frame; and an eye gaze position estimator that estimates an eye gaze position on the basis of images of an eye and a ridge of a nose included in a facial image captured by said image-capturing unit.

22 Claims, 8 Drawing Sheets

(56) References Cited

U.S. PATENT DOCUMENTS

| | | | | |
|---|---|---|---|---|
| 8,733,928 B1* | 5/2014 | Lewis | G06F 3/011 | 345/8 |
| 8,878,749 B1* | 11/2014 | Wu | G01S 17/06 | 345/8 |
| 8,929,589 B2* | 1/2015 | Publicover | G06K 9/00604 | 382/103 |
| 8,998,414 B2* | 4/2015 | Bohn | G02B 27/0093 | 351/210 |
| 9,141,190 B2* | 9/2015 | Miyamoto | G06F 3/013 | |
| 9,223,401 B1* | 12/2015 | Raffle | G06F 3/013 | |
| 9,256,987 B2* | 2/2016 | Ackerman | G06T 19/006 | |
| 9,390,326 B2* | 7/2016 | Publicover | G06K 9/00604 | |
| 9,563,274 B2* | 2/2017 | Senanayake | G06F 3/016 | |
| 9,612,403 B2* | 4/2017 | Abovitz | G02B 6/34 | |
| 9,658,473 B2* | 5/2017 | Lewis | G02B 27/0101 | |
| 9,665,983 B2* | 5/2017 | Spivack | G06F 3/013 | |
| 9,729,819 B2* | 8/2017 | Im | G06T 19/006 | |
| 9,736,357 B2* | 8/2017 | Kudo | H04N 5/23293 | |
| 9,861,279 B2* | 1/2018 | Spasovski | A61B 3/113 | |
| 9,898,080 B2* | 2/2018 | Kang | G06K 9/00597 | |
| 9,921,413 B2* | 3/2018 | Xu | G02B 30/40 | |
| 10,032,074 B2* | 7/2018 | Publicover | G06K 9/00604 | |
| 10,039,445 B1* | 8/2018 | Torch | A61B 3/113 | |
| 10,073,518 B2* | 9/2018 | Rahman | G06F 1/163 | |
| 10,088,899 B2* | 10/2018 | Plummer | G06K 9/00268 | |
| 10,089,786 B2* | 10/2018 | Liu | G06T 19/006 | |
| 10,156,900 B2* | 12/2018 | Publicover | G06F 21/64 | |
| 10,185,147 B2* | 1/2019 | Lewis | H04L 5/0035 | |
| 10,242,501 B1* | 3/2019 | Pusch | H04N 21/6587 | |
| 10,268,438 B2* | 4/2019 | Chen | A63F 13/213 | |
| 10,303,245 B2* | 5/2019 | Ha | G06F 1/163 | |
| 10,307,053 B2* | 6/2019 | Fayolle | A61B 3/113 | |
| 10,345,592 B2* | 7/2019 | Samec | A61B 3/1005 | |
| 10,558,272 B2* | 2/2020 | Parshionikar | G06F 3/0346 | |
| 10,628,947 B2* | 4/2020 | Kang | G06T 7/248 | |
| 10,636,217 B2* | 4/2020 | Osman | A63F 13/525 | |
| 10,788,892 B2* | 9/2020 | Sharma | G02B 27/0944 | |
| 10,820,121 B2* | 10/2020 | Lunner | G02C 11/06 | |
| 10,834,380 B2* | 11/2020 | Tanaka | H04N 13/366 | |
| 10,914,951 B2* | 2/2021 | Liu | G06F 3/0304 | |
| 10,962,772 B2* | 3/2021 | Kang | G02B 27/0025 | |
| 2002/0039111 A1* | 4/2002 | Gips | G06F 3/011 | 715/700 |
| 2005/0180740 A1* | 8/2005 | Yokoyama | G06F 1/1626 | 396/421 |
| 2006/0203197 A1* | 9/2006 | Marshall | A61B 5/18 | 351/246 |
| 2007/0291231 A1* | 12/2007 | Hammoud | G06K 9/00604 | 351/222 |
| 2011/0242486 A1* | 10/2011 | Ebisawa | A61B 5/168 | 351/206 |
| 2012/0144312 A1* | 6/2012 | Miyamoto | G06F 3/048 | 715/744 |
| 2012/0290401 A1* | 11/2012 | Neven | G06K 9/00671 | 705/14.68 |
| 2012/0313857 A1* | 12/2012 | Senanayake | G06F 3/0202 | 345/168 |
| 2013/0077049 A1* | 3/2013 | Bohn | G02B 27/017 | 351/210 |
| 2013/0114850 A1* | 5/2013 | Publicover | G06K 9/00604 | 382/103 |
| 2013/0120712 A1* | 5/2013 | Spasovski | A61B 3/113 | 351/209 |
| 2013/0208234 A1* | 8/2013 | Lewis | G06F 3/011 | 351/158 |
| 2013/0242262 A1* | 9/2013 | Lewis | G02B 27/0093 | 351/209 |
| 2014/0126782 A1* | 5/2014 | Takai | G06F 3/04842 | 382/116 |
| 2014/0222558 A1* | 8/2014 | Spivack | G09G 5/377 | 705/14.51 |
| 2014/0247286 A1* | 9/2014 | Chi | G02B 27/0093 | 345/672 |
| 2014/0375680 A1* | 12/2014 | Ackerman | G06T 19/006 | 345/633 |
| 2015/0049012 A1* | 2/2015 | Liu | G02B 27/017 | 345/156 |
| 2015/0049013 A1* | 2/2015 | Rahman | G06F 3/013 | 345/156 |
| 2015/0049112 A1* | 2/2015 | Liu | G06T 19/006 | 345/633 |
| 2015/0062402 A1* | 3/2015 | Kudo | G06F 3/013 | 348/333.02 |
| 2015/0126281 A1* | 5/2015 | Lewis | G06F 3/013 | 463/36 |
| 2015/0185482 A1* | 7/2015 | Lewis | G02C 7/12 | 345/157 |
| 2015/0185506 A1* | 7/2015 | Lewis | A63F 13/5255 | 351/159.56 |
| 2015/0220779 A1* | 8/2015 | Publicover | A61B 3/024 | 348/78 |
| 2015/0268483 A1* | 9/2015 | Lewis | G02C 11/10 | 351/49 |
| 2015/0309264 A1* | 10/2015 | Abovitz | G02B 6/34 | 385/33 |
| 2015/0331486 A1* | 11/2015 | Okubo | G06F 3/0346 | 345/156 |
| 2016/0042648 A1* | 2/2016 | Kothuri | A63F 13/213 | 434/236 |
| 2016/0054568 A1* | 2/2016 | Lewis | G02B 27/0093 | 351/209 |
| 2016/0054569 A1* | 2/2016 | Lewis | G02C 7/101 | 351/209 |
| 2016/0270656 A1* | 9/2016 | Samec | A61B 5/6803 | |
| 2016/0280136 A1* | 9/2016 | Besson | B60R 1/00 | |
| 2016/0302663 A1* | 10/2016 | Fayolle | A61B 3/113 | |
| 2016/0328015 A1* | 11/2016 | Ha | G06F 1/163 | |
| 2016/0337612 A1* | 11/2016 | Im | G06T 19/006 | |
| 2017/0007182 A1* | 1/2017 | Samec | A61B 3/022 | |
| 2017/0068315 A1* | 3/2017 | Kang | G06K 9/00597 | |
| 2017/0083087 A1* | 3/2017 | Plummer | G06K 9/00845 | |
| 2017/0097511 A1* | 4/2017 | Xu | H04N 13/332 | |
| 2017/0116476 A1* | 4/2017 | Publicover | A61B 3/113 | |
| 2017/0235931 A1* | 8/2017 | Publicover | G06F 3/013 | |
| 2018/0004478 A1* | 1/2018 | Chen | G06F 3/1454 | |
| 2018/0041751 A1* | 2/2018 | Tanaka | G06T 19/006 | |
| 2018/0144483 A1* | 5/2018 | Kang | G06K 9/4642 | |
| 2018/0239425 A1* | 8/2018 | Jang | G02B 27/017 | |
| 2018/0314881 A1* | 11/2018 | Sud | G06F 3/011 | |
| 2018/0338093 A1* | 11/2018 | Lee | H04N 21/42204 | |
| 2018/0364810 A1* | 12/2018 | Parshionikar | G06F 3/017 | |
| 2019/0080519 A1* | 3/2019 | Osman | H04N 13/344 | |
| 2019/0082170 A1* | 3/2019 | Akahori | G06F 3/013 | |
| 2019/0129165 A1* | 5/2019 | Kang | G02B 27/0093 | |
| 2019/0174237 A1* | 6/2019 | Lunner | G06F 3/015 | |
| 2019/0179423 A1* | 6/2019 | Rose | G02B 27/0172 | |
| 2019/0286406 A1* | 9/2019 | Chen | A63F 13/26 | |
| 2019/0361523 A1* | 11/2019 | Sharma | G06F 3/013 | |

FOREIGN PATENT DOCUMENTS

| | | |
|---|---|---|
| JP | 5824697 B1 | 11/2015 |
| JP | 2015-232771 A | 12/2015 |

* cited by examiner

GOGGLE TYPE DISPLAY DEVICE, EYE GAZE DETECTION METHOD, AND EYE GAZE DETECTION SYSTEM

BACKGROUND OF THE INVENTION

1. Field of the Invention

The present invention relates to a goggle type display device, an eye gaze detection method, and an eye gaze detection system.

2. Description of the Related Art

Video display devices that display 3D video (images) on head-mounted displays have been known with the advent of techniques such as virtual reality (VR) or augmented reality (AR). With such a video display device, which position in a displayed image a user is looking at (hereinafter referred to as an eye gaze position of the user) is detected, and the detected eye gaze position of the user is displayed with a "+" mark, for example, being superimposed on the displayed image.

The eye gaze position of the user is detected by shooting an eye of the user by a camera and estimating the eye gaze position on the basis of the video of the eye such as a movement of the retina or the iris. For example, a face detection method in which a pupil image is obtained by a camera for photographing pupils and a naris image is obtained by a camera for photographing nares to detect the eye gaze and facial position of a subject has been proposed (Japanese Patent Application Laid-Open No. 2015-232771, for example).

In a video display device having a goggle type (eyeglass type) display, such as VR glasses or AR glasses, to be worn on a face, a camera needs to be disposed at a position in a narrow space that is less likely to come into the user's field of vision. Thus, the eye and the camera are placed closer to each other.

In view of the above, a head-mounted display that photographs an eye of a user to detect the eye gaze position while making a distance between the eye and a camera longer with the use of a half mirror has been proposed (Japanese Patent No. 5824697, for example).

Other conceivable methods in which an eye of a user is photographed with the eye and a camera being placed closer to each other include a method in which an eye is photographed with the use of a wide-angle lens to widen the angle of view of the camera, and a method in which an entire eye is photographed in a divided manner with the use of a large number of cameras.

SUMMARY OF THE INVENTION

In the aforementioned head-mounted display using the half mirror, since the half mirror is disposed between the eye and a screen, the image quality of the display may deteriorate. Moreover, the cost of such a head-mounted display increases by an amount corresponding to the cost of the half mirror, and the size of a VR case (goggles) increases by the addition of the half mirror.

The employment of the wide-angle lens or the large number of cameras leads to a cost increase corresponding to such a wide-angle lens or the number of cameras.

The present invention has been made in view of the aforementioned problems. It is an object of the present invention to provide a goggle type display device, an eye gaze detection method, and an eye gaze detection system that can detect the eye gaze position of a user while preventing deterioration in image quality or increase in cost and size.

According to one aspect of the present invention, a goggle type display device with a goggle-shaped frame and a display mounted on said frame includes: an image-capturing unit disposed inside of the frame; and an eye gaze position estimator configured to estimate an eye gaze position on the basis of images of an eye and a ridge of a nose included in a facial image captured by the image-capturing unit.

According to another aspect of the present invention, an eye gaze detection method in a goggle type display device including a goggle-shaped frame and a display and capable of being worn on the head of a user includes: a step of photographing the face of the user wearing the frame to obtain a facial image of the user including at least one of the eyes and the ridge of the nose; and a step of estimating an eye gaze position on the basis of the facial image.

According to still another aspect of the present invention, an eye gaze detection system includes: an image-capturing unit configured to photograph a facial image including at least one of the eyes and the ridge of the nose; a target site detector configured to detect an image of the at least one of the eyes and an image of the ridge of the nose from the facial image; and an eye gaze position detector configured to detect an eye gaze position on the basis of the image of the at least one of the eyes and the image of the ridge of the nose.

The goggle type display device, the eye gaze detection method, and the eye gaze detection system according to the present invention allow for the detection of the eye gaze position of the user while preventing deterioration in image quality or increase in cost and size.

BRIEF DESCRIPTION OF THE DRAWINGS

Features of the present invention will be described in the following description with reference to the accompanying drawings.

DETAILED DESCRIPTION OF THE INVENTION

Embodiments of the present invention will be described below with reference to the drawings. Note that substantially the same or equivalent portions will be denoted by the same reference numerals throughout the following description of the embodiments and the accompanying drawings.

First Embodiment

Figure 1:
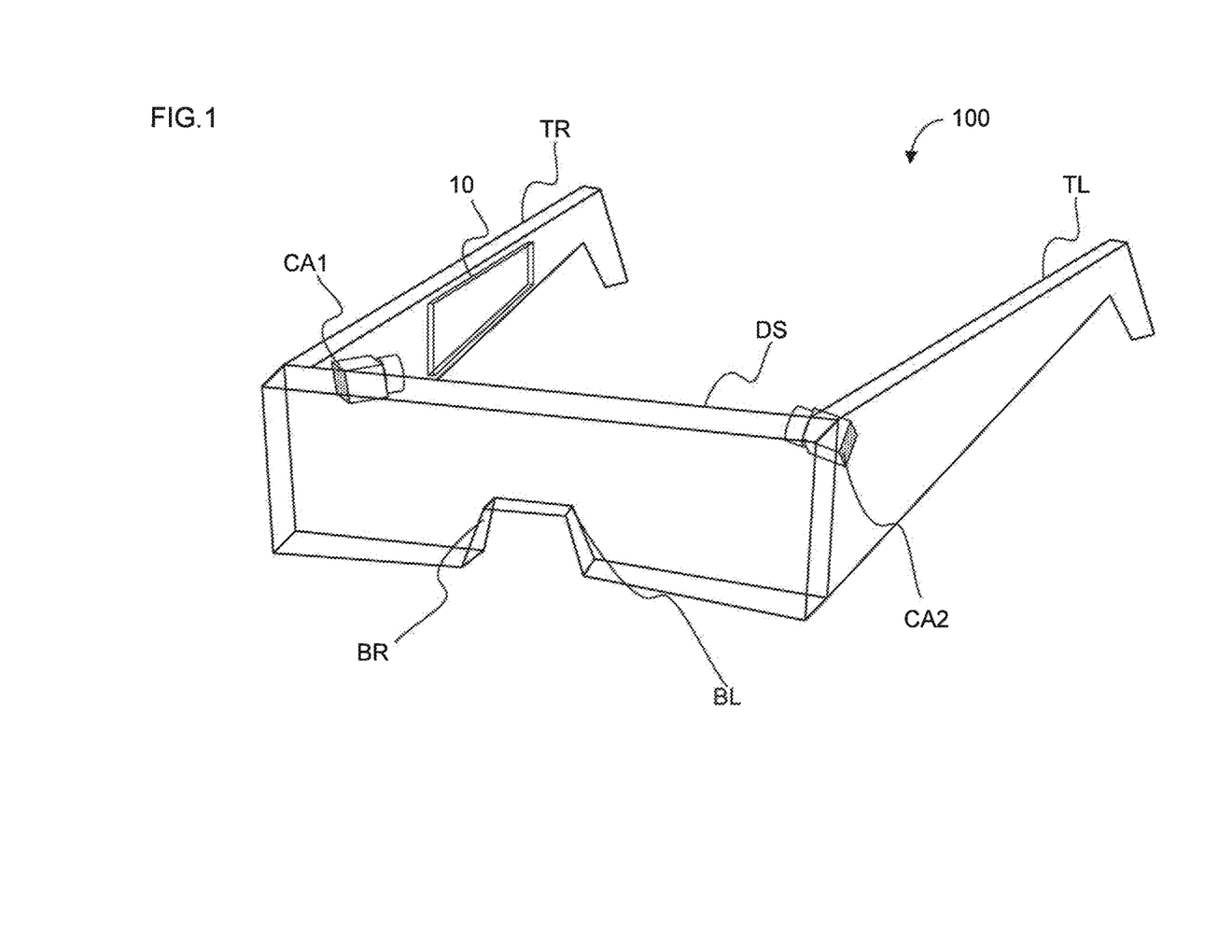
FIG. 1 is a schematic diagram showing an appearance of a goggle type display device according to a first embodiment.

FIG. 1 is a schematic diagram showing an appearance of a goggle type display device 100 according to the present embodiment. An example of the goggle type display device 100 is a pair of virtual reality (VR) goggles used for displaying VR video. The goggle type display device 100 is constituted by a goggle-shaped frame that can be worn on the head of a user.

The goggle-shaped frame has left and right temples TL and TR, which are parts to be hooked on the ears of the user when worn. The goggle-shaped frame is worn on the head of the user with left and right parts (indicated as BL and BR in the figure) of a bridge having been in close contact with the ridge of the nose. A display (screen DS) is provided between the left and right temples TL and TR and in front of the eyes of the user wearing the goggle-shaped frame.

Cameras CA1 and CA2 are mounted inside of the goggle-shaped frame. The camera CA1 is disposed at a position closer to the screen DS on an inner side surface of the right temple TR in the goggle-shaped frame. The camera CA2 is disposed at a position closer to the screen DS on an inner side surface of the left temple TL in the goggle-shaped frame. A chip including an image processor 10 is provided on the inner side surface of either one of the temples TR and TL (for example, the right temple TR) in the goggle-shaped frame.

Figure 2A:
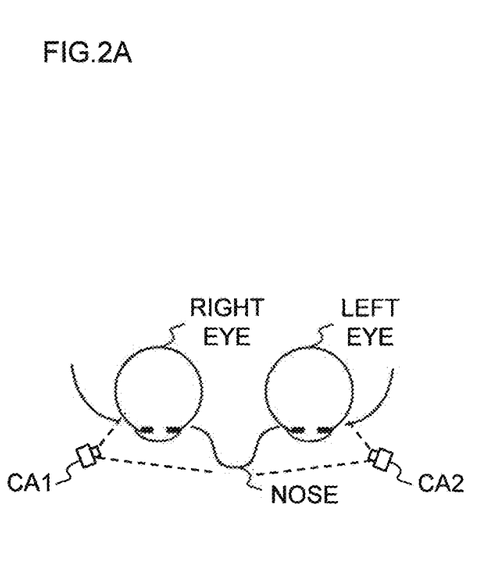
FIG. 2A is a diagram showing a positional relationship between cameras and the eyes of a user as viewed from above.

FIG. 2A is a schematic diagram showing a positional relationship between the eyes and nose of the user wearing the goggle-shaped frame and the cameras CA1 and CA2 as viewed from above in a direction from the top of the head of the user toward the toes. The camera CA1 photographs the right eye and the ridge of the nose of the user from the right side of the right eye of the user. The camera CA2 photographs the left eye and the ridge of the nose of the user from the left side of the left eye of the user.

Figure 2B:
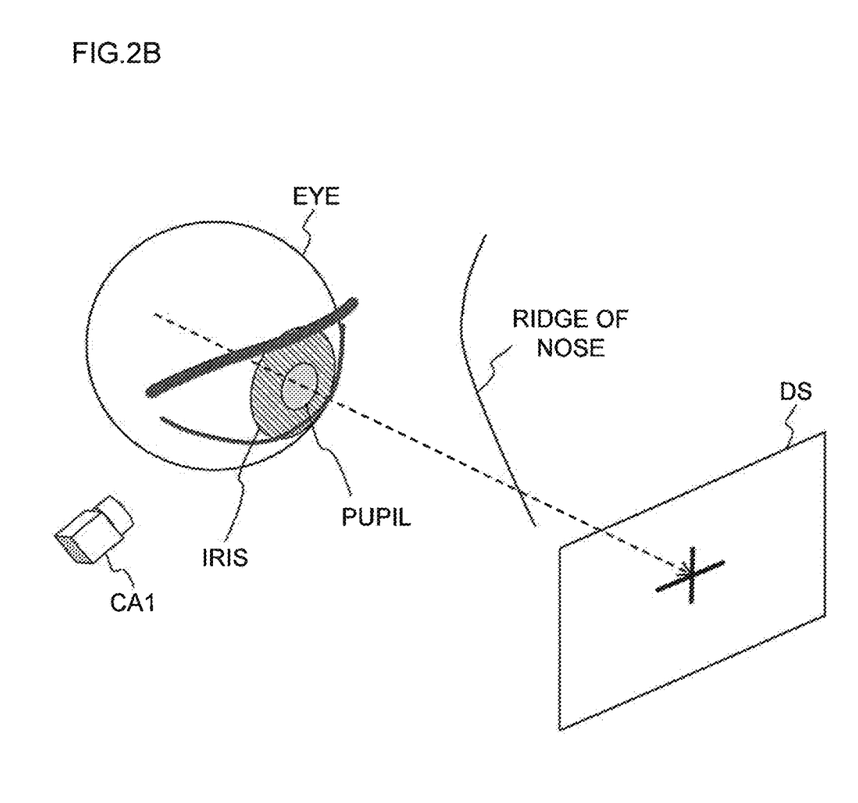
FIG. 2B is a diagram showing a positional relationship among the camera, a screen, and the right eye and the ridge of the nose of the user.

FIG. 2B is a diagram showing a positional relationship among the camera CA1, the screen DS, and the right eye and the ridge of the nose of the user. The camera CA1 photographs part of the face including the pupil, iris, upper and lower lids of the right eye of the user, and the ridge of the nose. Information of an eye gaze position (indicated by a "+" mark in the figure) indicating the position on the screen where the user is having visual contact with is displayed on the screen DS. Note that the same applies also to a positional relationship among the camera CA2, the screen DS, and the left eye and the ridge of the nose of the user.

In the goggle type display device 100, the right part including the camera CA1 and the left part including the camera CA2 have the same configuration. The configuration and operation of the right part of the goggle type display device 100 will be described below, and a description on the left part thereof will be omitted.

Figure 3:
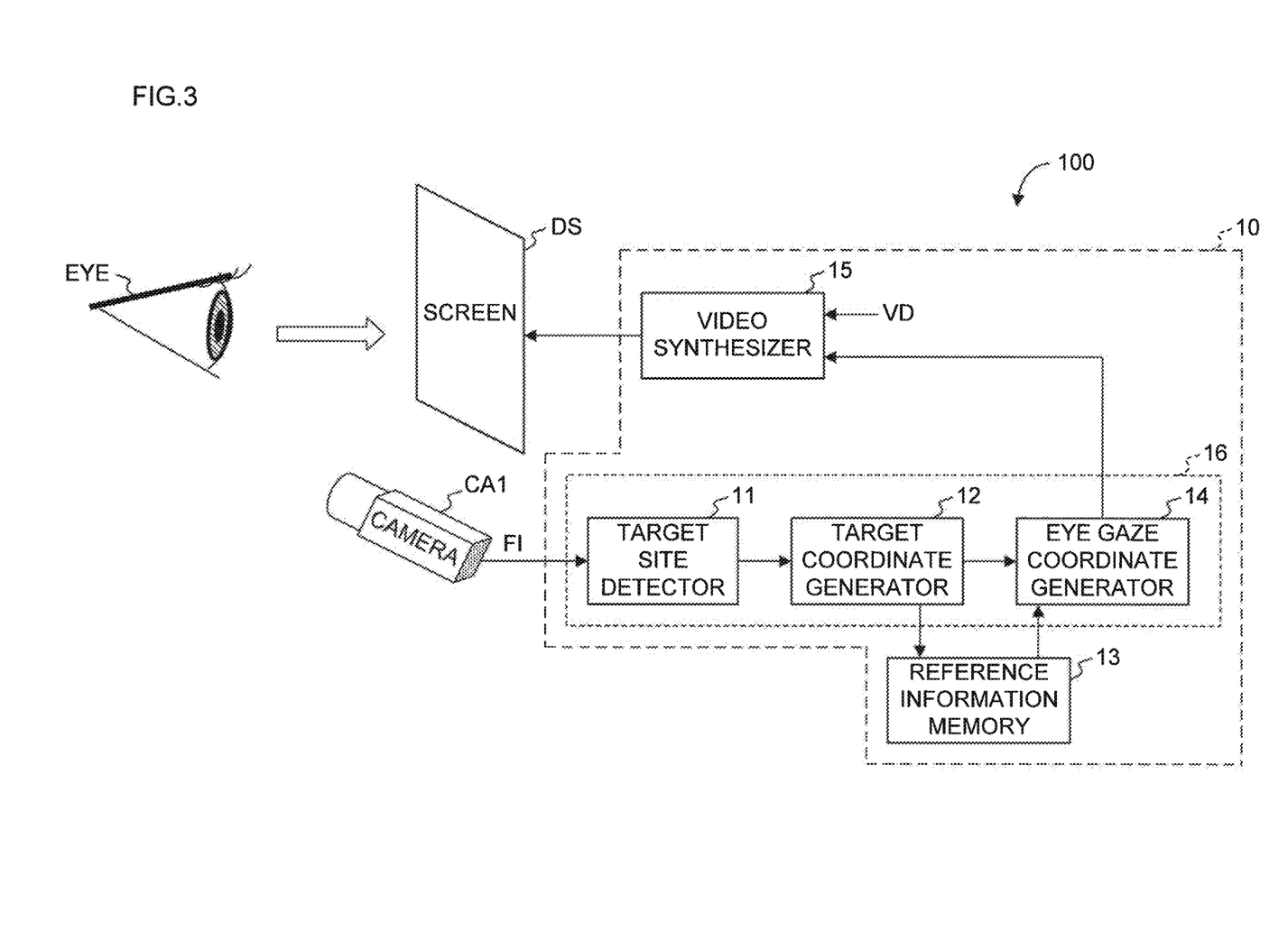
FIG. 3 is a block diagram showing a configuration of the goggle type display device according to the first embodiment.

FIG. 3 is a block diagram showing the configuration of the right part of the goggle type display device 100 according to the present embodiment. The goggle type display device 100 includes the camera CA1, the screen DS, and the image processor 10. The image processor 10 is constituted by a target site detector 11, a target coordinate generator 12, a reference information memory 13, an eye gaze coordinate generator 14, and a video synthesizer 15. The target site detector 11, the target coordinate generator 12, and the eye gaze coordinate generator 14 together constitute an eye gaze position estimator 16 that estimates an eye gaze position of the user.

The camera CA1 is constituted by a near-infrared camera, for example. The camera CA1 photographs the face of the user including the right eye (indicated as EYE in the figure) and the ridge of the nose of the user to obtain a facial image FI. The camera CA1 then provides the facial image FI to the target site detector 11.

Figure 4:
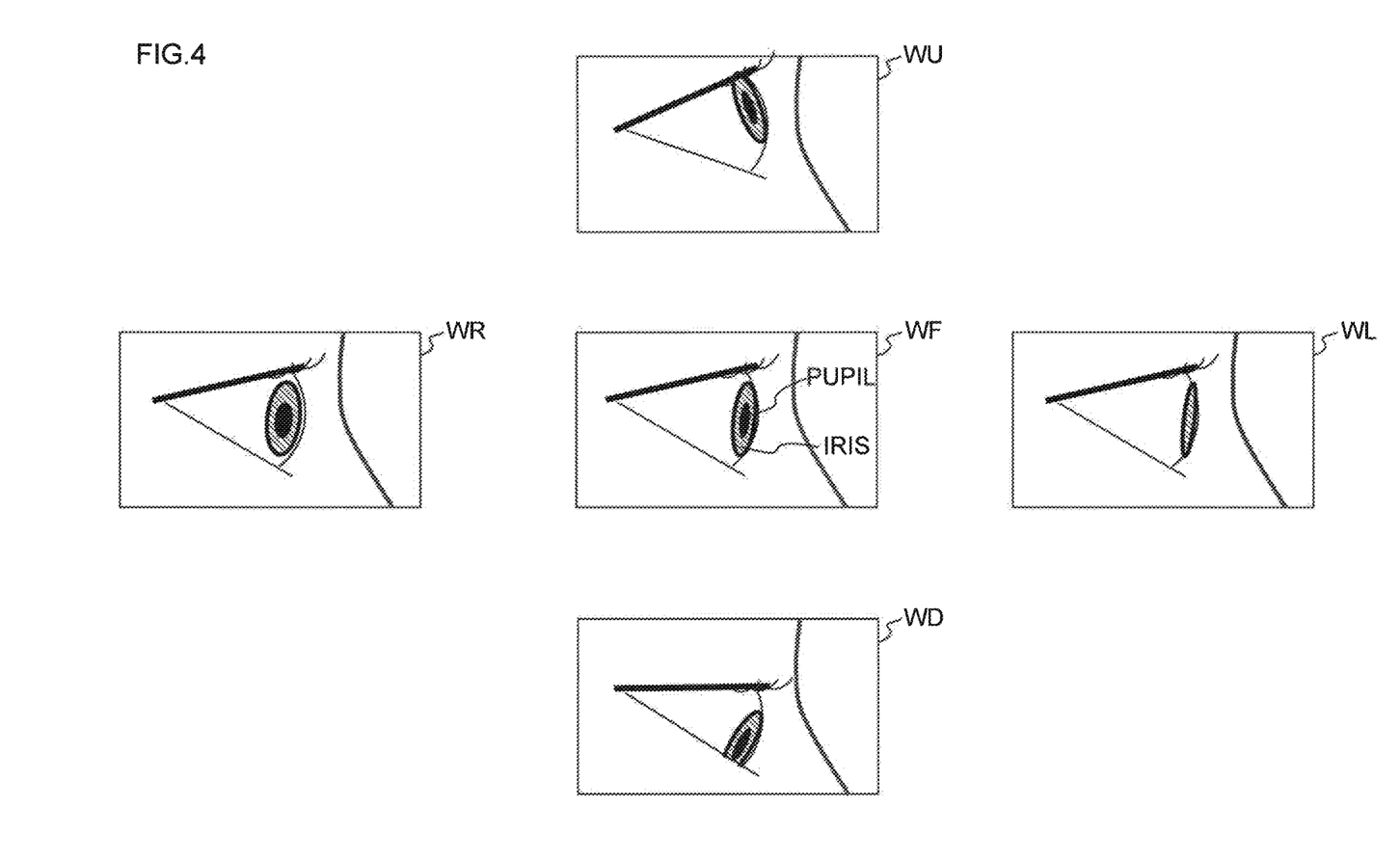
FIG. 4 is a diagram showing image examples of the right eye photographed by the camera.

FIG. 4 is a schematic diagram showing examples of the facial image FI. "WF" shows the facial image FI in a state where the user is looking forward; "WR" shows the facial image FI in a state where the user is looking right; "WL" shows the facial image FI in a state where the user is looking left; "WU" shows the facial image FI in a state where the user is looking up; and "WD" shows the facial image FI in a state where the user is looking down.

As shown in WR, WF, and WL, eye movements in the left and right directions can be obtained on the basis of the position and aspect ratio of the elliptical image of the pupil or the iris. Eye movements in the upward and downward directions, on the other hand, can be obtained on the basis of the position of the elliptical image of the pupil or the iris and the tilt of such an ellipse as shown in WF, WU, and WD. Since the upper lid and the lower lid move in conjunction with the upward and downward eye movements, the eye movements in the upward and downward directions can be obtained also on the basis of the positions and angles of the upper and lower lids as captured from the side.

Since relative positions of the upper and lower lids, the pupil, and the iris with respect to the ridge of the nose are obtained, upward, downward, leftward, and rightward eye movements can be obtained even at the occurrence of positional displacement of the camera CA1.

Referring back to FIG. 3, the target site detector 11 is an image detector that detects the images of the ridge of the nose, the upper and lower lids, the pupil, and the iris (hereinafter, these are referred to generally as "target sites") from the facial image FI by means of image recognition. When the camera CA1 is a near-infrared camera, for example, the target site detector 11 detects (extracts) the images of the target sites on the basis of the shades of colors in the facial image FI.

The target coordinate generator 12 generates coordinate information indicating positions of the target sites on the basis of the images of the detected target sites. The target coordinate generator 12 also calculates the angles of the images of the upper and lower lids as well as the widths and tilts of the ellipses of the images of the pupil and the iris.

The reference information memory 13 stores information obtained by calibration as reference information. The calibration is performed immediately after the user wears the goggle type display device 100, for example. In this calibration, a mark for functioning as a point of gaze is displayed on the screen DS, for example. Facial images of the user are then photographed while moving, with the use of such a mark, the eye gaze position of the user to nine points, i.e., the center, up, down, left, right, obliquely upper right, upper left, lower right, and lower left on the screen. In each of the facial images, reference information including information on the coordinates of the ridge of the nose, the upper and lower lids, and the ellipses of the pupil and the iris as well as information on the angles of the images of the upper and lower lids, and the widths and tilts of the ellipses of the pupil and the iris is obtained.

On the basis of the information on the coordinates of the ridge of the nose, the upper and lower lids, and the ellipses of the pupil and the iris as well as the information on the angles of the images of the upper and lower lids and the widths and tilts of the ellipses of the pupil and the iris, which have been generated by the target coordinate generator 12, the eye gaze coordinate generator 14 generates eye gaze coordinates. At this time, the eye gaze coordinate generator 14 generates the eye gaze coordinates while correcting an image displacement on the basis of the reference information stored in the reference information memory 13.

The video synthesizer 15 synthesizes the information on the coordinates of the eye gaze position, which has been generated by the eye gaze coordinate generator 14, and video information VD, which has been provided from a video output unit (not shown). Consequently, an image (for example, the "+" mark) representing the eye gaze position as shown in FIG. 2B is displayed on the screen DS in addition to the video based on the video information VD.

Figure 5:
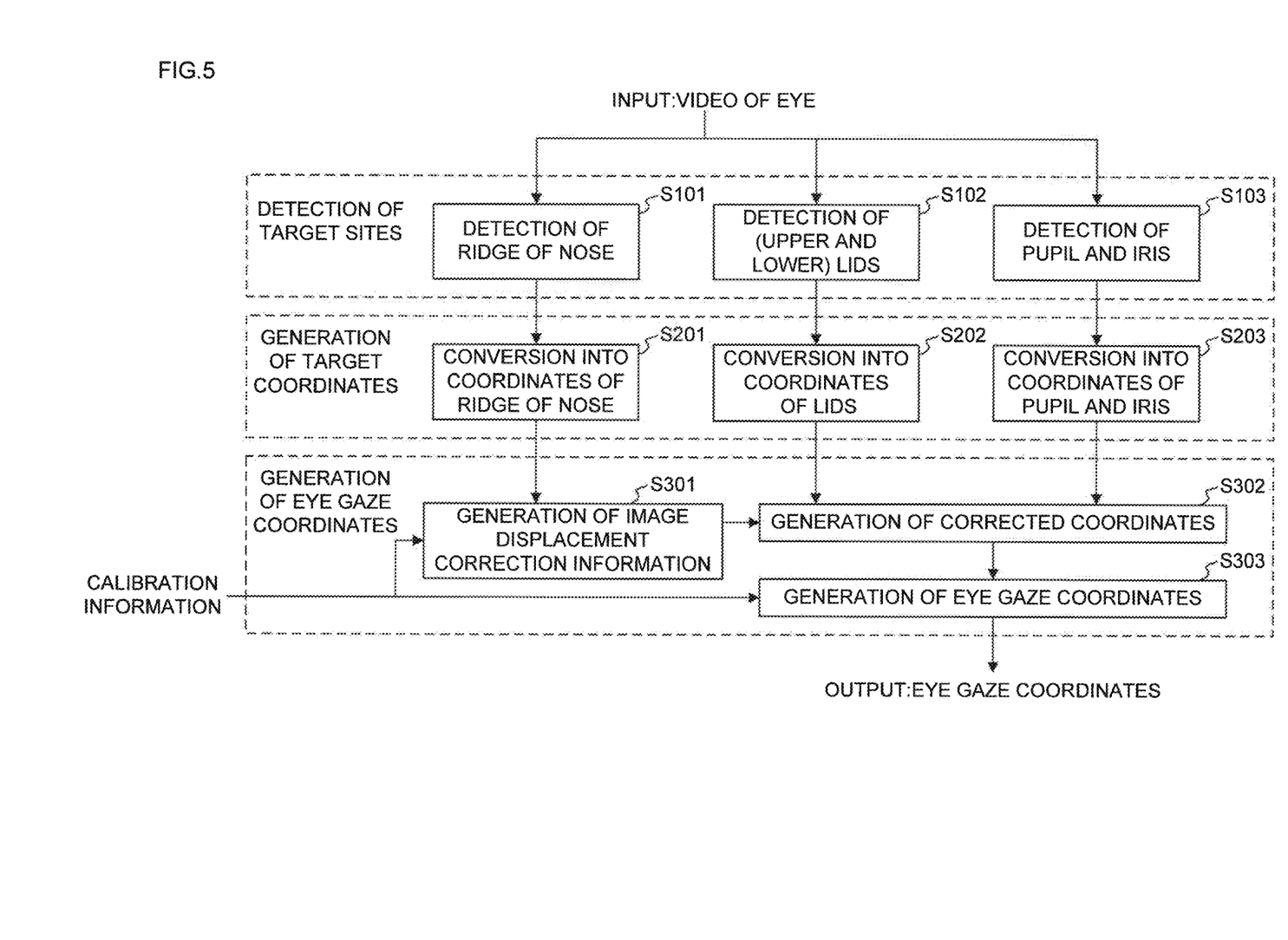
FIG. 5 is a flowchart showing processing operations performed by components of the goggle type display device.

Processing operations of the target site detector 11, the target coordinate generator 12, and the eye gaze coordinate generator 14 in the goggle type display device 100 of the present embodiment will be described next with reference to a flowchart of FIG. 5.

The target site detector 11 detects the "ridge of the nose" as a facial contour of the user from the facial image FI (step S101).

The target site detector 11 detects the upper lid and the lower lid of the user from the facial image FI (step S102).

The target site detector 11 detects, and extracts as elliptical images, the pupil and iris of the user from the facial image FI (step S103).

The target coordinate generator 12 converts the ridge of the nose (facial contour) of the user, which has been detected by the target site detector 11, into coordinate information (step S201).

The target coordinate generator 12 converts the positions of the upper and lower lids of the user, which have been detected by the target site detector 11, into coordinate information (step S202). The target coordinate generator 12 also calculates the angles of the images of the upper and lower lids with reference to the ridge of the nose.

The target coordinate generator 12 converts the positions of the pupil and iris of the user, which have been detected by the target site detector 11, into coordinate information (step S203). The target coordinate generator 12 also calculates the widths of the ellipses of the pupil and the iris and the tilts of such ellipses with reference to the ridge of the nose.

The eye gaze coordinate generator 14 compares the information on the coordinates of the ridge of the nose (facial contour) obtained in the step S201 with the information on the coordinates of the ridge of the nose obtained at the time of the calibration, which is included in the reference information stored in the reference information memory 13. The eye gaze coordinate generator 14 then generates image displacement correction information that indicates an image displacement between the facial image at the time of the calibration and the facial image FI obtained by the camera CA1 in an actual operation (step S301).

On the basis of the image displacement correction information generated in the step S301, the eye gaze coordinate generator 14 corrects the positional coordinates and angles of the upper and lower lids, which have been obtained in the step S202, as well as the positional coordinates of the pupil and the iris, and the widths and tilts of the ellipses of the pupil and the iris, which have been obtained in the step S203 (step S302).

The eye gaze coordinate generator 14 generates eye gaze coordinates on the basis of the information on the positional coordinates and angles of the upper and lower lids, the positional coordinates of the pupil and the iris, and the widths and tilts of the ellipses of the pupil and the iris corrected in the step S302, and such information obtained at the time of the calibration (step S303).

The eye gaze coordinates of the right eye are generated by the above processing operations. Note that the eye gaze coordinates of the left eye are generated by similar processing operations.

As just described, the cameras are disposed lateral to the eyes of the user in the goggle type display device 100 of the present embodiment. The cameras photograph the eyes (the pupil, the iris, and the upper and lower lids) of the user and the ridge of the nose. The image processor 10 then estimates the eye gaze position on the basis of the information on the positions of the pupil, the iris, and the upper and lower lids, the information on the widths of the images of the pupil and the iris, and the information on the tilts of the images of the pupil and the iris as well as the angles of the upper and lower lids with reference to the ridge of the nose.

In the goggle type display device 100 of the present embodiment, the movements of the pupil, the iris, and the upper and lower lids, which move in conjunction with one's eye gaze, are calculated with reference to the ridge of the nose, which does not move in conjunction with one's eye gaze. With such a configuration, since the entire pupil or iris needs not be captured by the camera, the camera can be disposed at a position relatively distant from the eye of the user. Thus, the eye gaze position of the user can be detected without using a wide-angle lens, a half mirror, or a large number of cameras, for example.

Therefore, the goggle type display device 100 of the present embodiment can detect the eye gaze position of the user while preventing deterioration in image quality or increase in cost and size.

Second Embodiment

A goggle type display device of the present embodiment differs from the goggle type display device 100 of the first embodiment in that a camera CA3 that photographs the right eye from the left side of the right eye and a camera CA4 that photographs the left eye from the right side of the left eye are provided in addition to the cameras CA1 and CA2. The camera CA3 is disposed, for example, in the right part BR of the bridge shown in FIG. 1. The camera CA4 is disposed, for example, in the left part BL of the bridge shown in FIG. 1.

Figure 6:
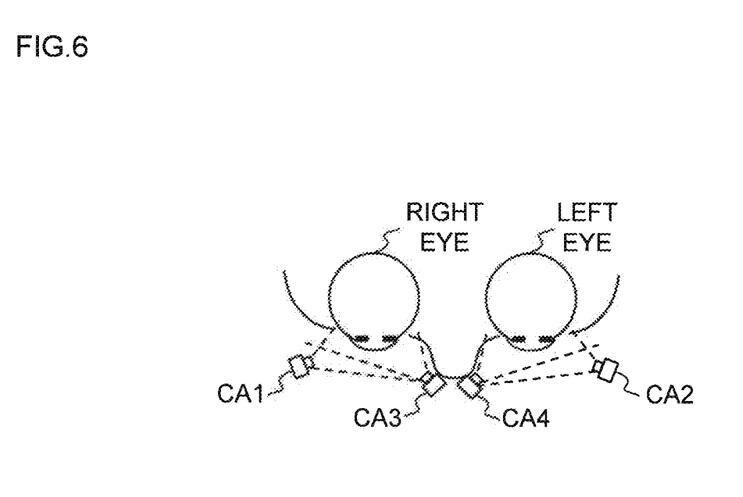
FIG. 6 is a schematic diagram showing a positional relationship between cameras and the eyes of a user according to a second embodiment.

FIG. 6 is a schematic diagram showing a positional relationship between the cameras in the goggle type display device of the present embodiment and the eyes and nose of the user as viewed from above in a direction from the top of the head of the user toward the toes. As with the first embodiment, the camera CA1 photographs the right eye and the ridge of the nose of the user from the right side. The camera CA2 photographs the left eye and the ridge of the nose of the user from the left side.

On the other hand, the camera CA3 photographs the right eye of the user from the left side. The camera CA4 photographs the left eye of the user from the right side. The photographing by the cameras CA3 and CA4 enables a facial image including the outer corner of the eye or the contour of the cheek of the user to be obtained.

In the goggle type display device of the present embodiment, the right part including the cameras CA1 and CA3 and the left part including the cameras CA2 and CA4 have the same configuration. The configuration and operation of the right part will be described below, and a description on the left part will be omitted.

Figure 7:
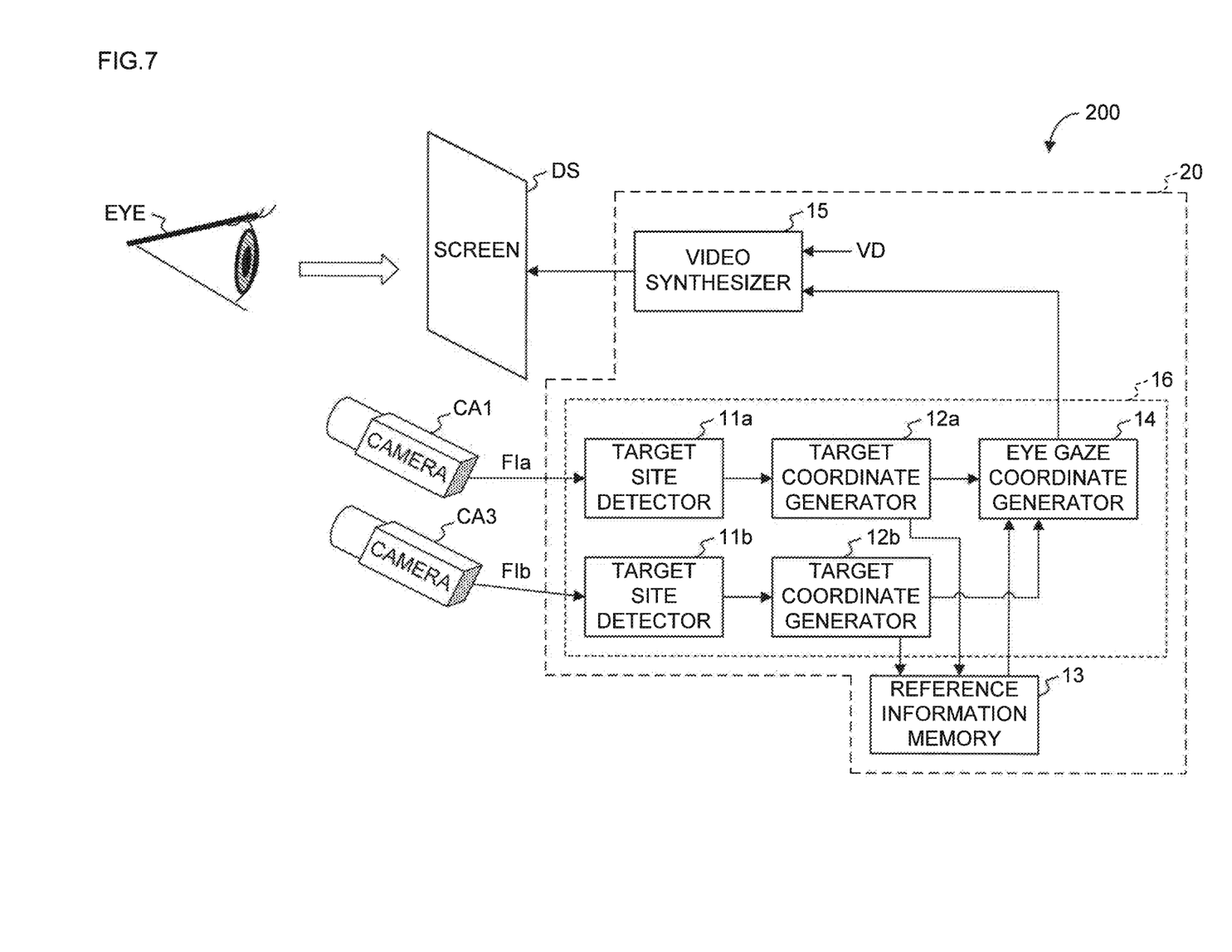
FIG. 7 is a block diagram showing the configuration of a goggle type display device according to the second embodiment.

FIG. 7 is a block diagram showing a configuration of the right part of a goggle type display device 200 according to the present embodiment. The goggle type display device 200 includes the cameras CA1 and CA3, a screen DS, and an image processor 20. The image processor 20 is constituted by target site detectors 11a and 11b, target coordinate generators 12a and 12b, a reference information memory 13, an eye gaze coordinate generator 14, and a video synthesizer 15. The target site detectors 11a and 11b, the target coordinate generators 12a and 12b, and the eye gaze coordinate generator 14 together constitute an eye gaze position estimator 16 that estimates an eye gaze position of the user.

The camera CA1 photographs the face of the user including the right eye and the ridge of the nose of the user to obtain a facial image FIa. The camera CA1 then provides the facial image FIa to the target site detector 11a.

The target site detector 11a detects the images of the ridge of the nose, the upper and lower lids, the pupil, and the iris from the facial image FIa by means of image recognition.

The target coordinate generator 12a generates coordinate information indicating the positions of the ridge of the nose, the upper and lower lids, the pupil, and the iris on the basis of the detected images. The target coordinate generator 12a also calculates the angles of the images of the upper and lower lids as well as the widths and tilts of the ellipses of the images of the pupil and the iris.

The camera CA3 photographs the face of the user including the right eye and the outer corner of the eye or the contour of the cheek of the user to obtain a facial image FIb. The camera CA3 then provides the facial image FIb to the target site detector 11b.

The target site detector 11b detects the images of the outer corner of the eye or the contour of the cheek, the upper and lower lids, the pupil, and the iris from the facial image FIb by means of image recognition.

The target coordinate generator 12b generates coordinate information indicating the respective positions of the outer corner of the eye or the contour of the cheek, the upper and lower lids, the pupil, and the iris on the basis of the detected images. The target coordinate generator 12b also calculates the angles of the images of the upper and lower lids as well as the widths and tilts of the ellipses of the images of the pupil and the iris.

As with the first embodiment, the camera CA1, the target site detector 11a, the target coordinate generator 12a, the camera CA3, the target site detector 11b, and the target coordinate generator 12b perform the operations described above in an actual operation and perform the operations described above at the time of calibration.

The reference information memory 13 stores, as reference information, information on the coordinates of the ridge of the nose, the upper and lower lids, the pupil, and the iris, information on the angles of the upper and lower lids, and information on the widths and tilts of the ellipses of the pupil and the iris, which have been generated by the target coordinate generator 12a at the time of the calibration, as well as information on the coordinates of the outer corner of the eye or the contour of the cheek, the upper and lower lids, the pupil, and the iris, information on the angles of the upper and lower lids, and information on the widths and tilts of the ellipses of the pupil and the iris, which have been generated by the target coordinate generator 12b at the time of the calibration.

The eye gaze coordinate generator 14 generates first eye gaze position coordinates on the basis of the information on the coordinates of the ridge of the nose, the upper and lower lids, the pupil, and the iris, the information on the angles of the upper and lower lids, and the information on the widths and tilts of the ellipses of the pupil and the iris, which have been obtained by the camera CA1, the target site detector 11a, and the target coordinate generator 12a, as well as such information obtained at the time of the calibration. Note that the first eye gaze position coordinates are generated through the steps S101 to S303 shown in FIG. 5 as with the first embodiment.

The eye gaze coordinate generator 14 generates second eye gaze position coordinates on the basis of the information on the coordinates of the outer corner of the eye or the contour of the cheek, the upper and lower lids, the pupil, and the iris, the information on the angles of the upper and lower lids, and the information on the widths and tilts of the ellipses of the pupil and the iris, which have been obtained by the camera CA3, the target site detector 11b, and the target coordinate generator 12b, as well as such information obtained at the time of the calibration. The second eye gaze position coordinates are generated through steps in which "the ridge of the nose" in the steps S101 to S303 shown in FIG. 5 is changed to "the outer corner of the eye or the contour of the cheek."

The eye gaze coordinate generator 14 generates the coordinates of the eye gaze position by synthesizing the first eye gaze position coordinates generated with reference to the ridge of the nose and the second eye gaze position coordinates generated with reference to the outer corner of the eye or the contour of the cheek.

The video synthesizer 15 synthesizes the information on the coordinates of the eye gaze position, which has been generated by the eye gaze coordinate generator 14, and video information VD, which has been provided from a video output unit (not shown). Consequently, an image representing the eye gaze position is displayed on the screen DS in addition to the original video based on the video information VD.

The eye gaze coordinates of the right eye are generated by the above-described operations of the components and displayed on the screen DS. Note that the generation, and display on the screen DS, of the eye gaze coordinates of the left eye are similarly performed.

The goggle type display device 200 of the present embodiment generates the coordinates of the eye gaze position on the basis of both the eye gaze position with reference to the ridge of the nose, which has been obtained on the basis of the image photographed by the camera CA1 disposed on the right side of the right eye (or the camera CA2 disposed on the left side of the left eye), and the eye gaze position with reference to the outer corner of the eye or the contour of the cheek, which has been obtained on the basis of the image photographed by the camera CA3 disposed on the left side of the right eye (or the camera CA4 disposed on the right side of the left eye). Therefore, the coordinates of the eye gaze position can be generated with higher accuracy as compared to a case where only the ridge of the nose is taken as a reference.

Figure 8:
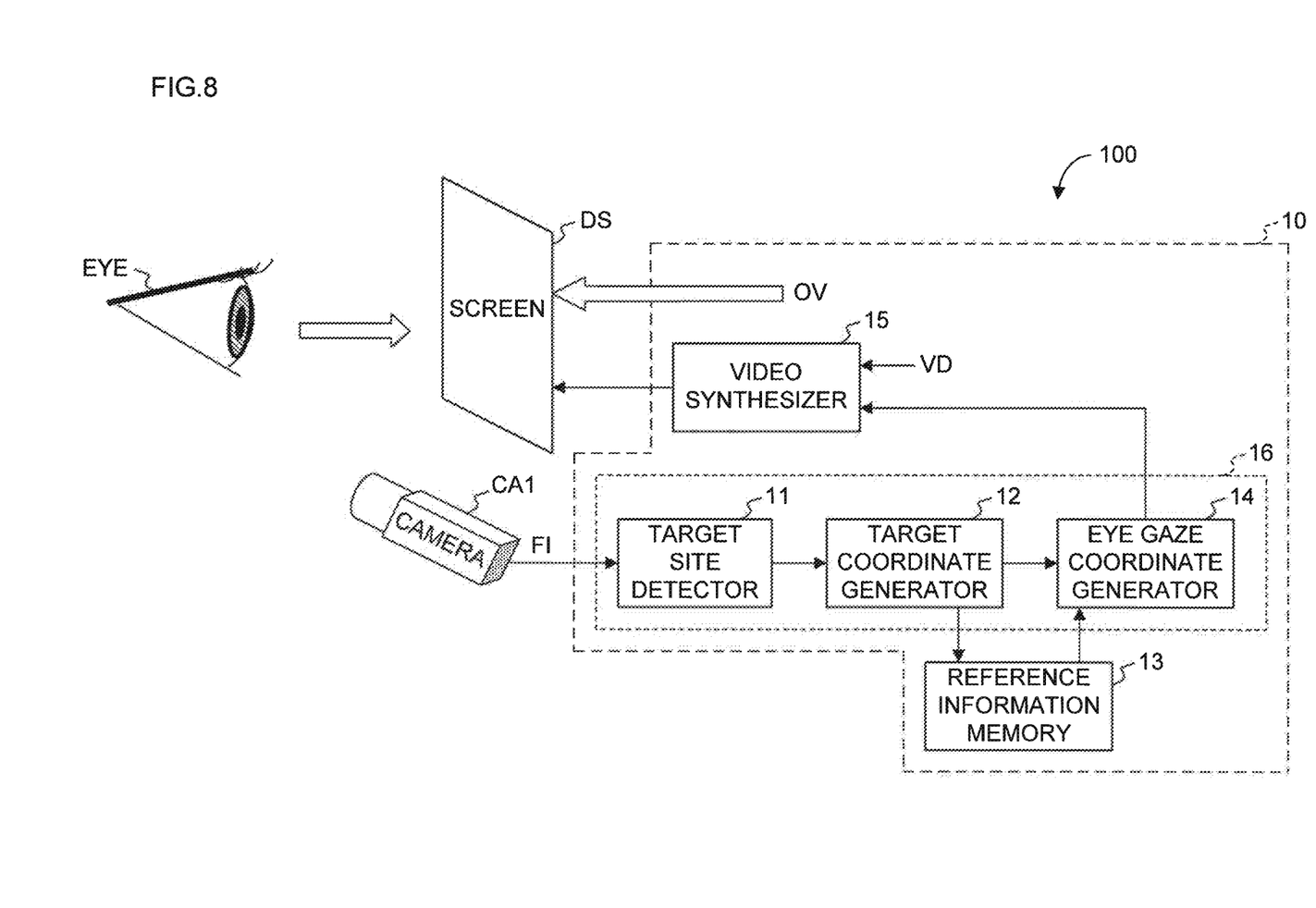
FIG. 8 is a block diagram showing a configuration of a goggle type display device for performing AR display.

Note that the present invention is not limited to the above-described embodiments. For example, the above-described embodiment has described, by way of example, the case where the goggle type display device 100 is a pair of VR goggles used for displaying VR image, and information on the coordinates of the eye gaze position and the video information VD are synthesized for display. The present invention, however, can be applied to a pair of augmented reality (AR) goggles used for displaying AR video, for example, and thus optical video OV and information on the coordinates of the eye gaze position can be synthesized for display as shown in FIG. 8.

In the above-described embodiments, the display devices have the goggle-shaped frame. The frame, however, may have an eyeglass shape without being limited to a goggle shape. That is, any display device with an outer shape including a frame having left and right temples that can be worn on the head of a user, and a screen or a glass part to be disposed in front of the eyes of the user when worn can be employed.

The above-described embodiments have described, by way of example, the case where the coordinates of the eye gaze position of the user are generated with the use of the positions and angles of the upper and lower lids as well as the positions, widths, and tilts of the elliptical images of the pupil and the iris. The coordinates of the eye gaze position, however, may be generated with the use of either the information on the upper and lower lids or the information on the pupil and the iris.

The above-described embodiments have described, by way of example, the case where the coordinates of the eye gaze position of the user are generated with the use of the positions, widths, and tilts of the elliptical images of both the pupil and the iris. The coordinates of the eye gaze position of the user, however, may be generated with the use of the position, width, and tilt of the image of one of the pupil and the iris.

The first embodiment has described the case where the goggle type display device 100 has the cameras CA1 and CA2. The goggle type display device, however, may be configured to include only one of the cameras CA1 and CA2 and thus detect the eye gaze position of only one of the left and right eyes. In this case, it is only necessary that the screen DS is disposed in front of the corresponding one of the left and right eyes.

The second embodiment has described, by way of example, the case where the cameras CA1, CA2, CA3, and CA4 are provided. However, the goggle type display device may be configured to include only one of the combination of the cameras CA1 and CA3 and the combination of the cameras CA2 and CA4.

The second embodiment has described the case where the coordinates of the eye gaze positions (the first eye gaze position and the second eye gaze position) for the cameras CA1 and CA3 are first generated, and then synthesized. However, single eye gaze position coordinates may be generated on the basis of the information obtained by the target coordinate generator 12*a* and the information obtained by the target coordinate generator 12*b*, rather than generating the coordinates of the eye gaze position for each camera and synthesizing the generated coordinates.

It is understood that the foregoing description and accompanying drawings set forth the preferred embodiments of the present invention at the present time. Various modifications, additions and alternative designs will, of course, become apparent to those skilled in the art in light of the foregoing teachings without departing from the spirit and scope of the disclosed invention. Thus, it should be appreciated that the present invention is not limited to the disclosed Examples but may be practiced within the full scope of the appended claims.

This application is based upon and claims the benefit of priority from the prior Japanese Patent Application No. 2017-173344 filed on Sep. 8, 2017, the entire contents of which are incorporated herein by reference.

What is claimed is:

1. A goggle type display device comprising a goggle-shaped frame and a display mounted on said frame including:
   an image-capturing unit configured to be disposed inside said frame so as to capture a facial image of a user wearing said goggle-shaped frame, the facial image including simultaneously an eye and a ridge of a nose; and
   an eye gaze position estimator configured to estimate an eye gaze position indicating a position on said display with which said user has a visual contact, on the basis of tilt of an ellipse of a pupil and an iris with reference to the ridge of the nose included in said facial image.

2. The goggle type display device according to claim 1, wherein said eye gaze position estimator comprises:
   a target site detector configured to detect an image of a pupil or an iris of said eye and an image of said ridge of the nose from said facial image; and
   an eye gaze coordinate generator configured to generate coordinates of said eye gaze position which is with reference to said display on the basis of said image of the pupil or the iris and said image of the ridge of the nose.

3. The goggle type display device according to claim 2, wherein said eye gaze coordinate generator generates coordinates of said eye gaze position on the basis of a shape of said image of the pupil or the iris and a position of said pupil or the iris with reference to said ridge of the nose.

4. The eye gaze detection system according to claim 3, wherein said shape of said image of the pupil or the iris refers to a width of ellipses of said image of the pupil or the iris.

5. The goggle type display device according to claim 2, wherein
   said target site detector detects images of an upper lid and a lower lid of said eye from said facial image, and
   said eye gaze coordinate generator generates coordinates of said eye gaze position on the basis of angles of said upper lid and said lower lid which is with reference to said ridge of the nose.

6. The goggle type display device according to claim 2, wherein
   said goggle-shaped frame includes a pair of temples, and
   said image-capturing unit is disposed on an inner side of at least one of said pair of temples.

7. The goggle type display device according to claim 2, further comprising a second image-capturing unit configured to obtain a second facial image which includes said eye and an outer corner of the eye or a contour of a cheek, wherein
   said target site detector detects an image of a pupil or an iris of said eye and an image of said outer corner of the eye or said contour of the cheek from said second facial image, and
   said eye gaze coordinate generator generates coordinates of said eye gaze position on the basis of a shape of said image of the pupil or the iris and a position of said pupil or said iris with reference to said outer corner of the eye or said contour of the cheek.

8. The goggle type display device according to claim 7, wherein said target site detector detects positions of an upper lid and a lower lid of said eye and a position of said outer corner of the eye or said contour of the cheek from said second facial image, and said eye gaze coordinate generator generates coordinates of said eye gaze position on the basis of angles of said upper lid and said lower lid which is with reference to said outer corner of the eye or said contour of the cheek.

9. The goggle type display device according to claim 7, wherein the second image-capturing unit is disposed in a bridge of said goggle-shaped frame.

10. The goggle type display device according to claim 7, wherein said eye gaze position estimator estimates said eye gaze position by synthesizing the coordinates of the eye gaze position generated on the basis of said facial image and the coordinates of the eye gaze position generated on the basis of said second facial image.

11. An eye gaze detection method in a goggle type display device, the goggle type display device comprising a goggle-shaped frame and a display and capable of being worn on a head of a user, the method including:
a step of photographing a face of the user wearing said frame to obtain a facial image of said user wearing said goggle-shaped frame, the facial image simultaneously including an eye and a ridge of a nose; and
a step of estimating an eye gaze position indicating a position on said display with which said user has a visual contact, on the basis of tilt of an ellipse of a pupil and an iris with reference to the ridge of the nose included in said facial image.

12. The eye gaze detection method according to claim 11, wherein said step of estimating the eye gaze position comprises:
a step of detecting an image of a pupil or an iris of said eye and an image of said ridge of the nose from said facial image; and
a step of generating coordinates of said eye gaze position which is with reference to said display on the basis of said image of the pupil or the iris and said image of the ridge of the nose.

13. The eye gaze detection method according to claim 12, wherein in said step of generating coordinates of the eye gaze position, coordinates of the eye gaze position are generated on the basis of a shape of said image of the pupil or the iris and a position of said pupil or said iris which is with reference to said ridge of the nose.

14. The eye gaze detection method according to claim 12, wherein said step of generating coordinates of the eye gaze position comprises:
a step of detecting images of an upper lid and a lower lid of said eye; and
a step of generating coordinates of the eye gaze position on the basis of angles of said upper lid and said lower lid which are with reference to said ridge of the nose.

15. The eye gaze detection method according to claim 12, further comprising:
a step of obtaining a second facial image including said eye and an outer corner of the eye or a contour of a cheek; and
a step of detecting an image of said pupil or said iris of the eye and an image of said outer corner of the eye or said contour of the cheek from said second facial image, wherein
in said step of generating coordinates of the eye gaze position, coordinates of the eye gaze position are generated on the basis of a shape of said image of the pupil or the iris and a position of said pupil or said iris which is with reference to said outer corner of the eye or said contour of the cheek.

16. The eye gaze detection method according to claim 15, wherein said step of generating coordinates of the eye gaze position comprises:
a step of detecting images of an upper lid and a lower lid of said eye and an image of said outer corner of the eye or said contour of the cheek from said second facial image; and
a step of generating said coordinates of the eye gaze position on the basis of angles of said upper lid and said lower lid which are with reference to said outer corner of the eye or said contour of the cheek.

17. The eye gaze detection method according to claim 15, wherein said step of estimating the eye gaze position comprises a step of synthesizing the coordinates of the eye gaze position generated on the basis of said facial image and the coordinates of the eye gaze position generated on the basis of said second facial image to estimate said eye gaze position.

18. An eye gaze detection system comprising:
an image-capturing unit configured to photograph a facial image of a user wearing a goggle-shaped frame, the facial image simultaneously including an eye and a ridge of a nose;
a target site detector configured to detect an image of said eye and an image of said ridge of the nose from said facial image; and
an eye gaze position detector configured to detect an eye gaze position indicating a position on a display with which said user has a visual contact, on the basis of tilt of an ellipse of a pupil and an iris with reference to the ridge of the nose included in said facial image.

19. The eye gaze detection system according to claim 18, wherein
said target site detector detects an image of a pupil or an iris of said eye, and
said eye gaze position detector detects said eye gaze position on the basis of a shape of said image of the pupil or the iris and a position of said pupil or said iris with reference to said ridge of the nose.

20. The eye gaze detection system according to claim 18, wherein
said target site detector detects images of an upper lid and a lower lid of said eye, and
said eye gaze position detector detects said eye gaze position on the basis of angles of said upper lid and said lower lid which are with reference to said ridge of the nose.

21. The eye gaze detection system according to claim 18, wherein
said image-capturing unit obtains a second facial image including said eye, an outer corner of the eye or a contour of a cheek,
said target site detector detects an image of the pupil or the iris of said eye and an image of said outer corner of the eye or said contour of the cheek from said second facial image, and
said eye gaze position detector detects said eye gaze position on the basis of a shape of said image of the pupil or the iris and a position of said pupil or said iris which is with reference to said outer corner of the eye or said contour of the cheek.

22. The eye gaze detection system according to claim 21, wherein said target site detector detects images of an upper lid and a lower lid of said eye from said second facial image, and said eye gaze position detector detects said eye gaze position on the basis of angles of said upper lid and said lower lid which is with reference to said outer corner of the eye or said contour of the cheek.

\* \* \* \* \*